United States Patent [19]
Garavalia
[11] 3,851,124
[45] Nov. 26, 1974

[54] CROSSPOINT MATRIX ARRANGEMENT FOR SPACE-DIVISION COMMUNICATION SWITCHING NETWORK

[75] Inventor: Ronald C. J. Garavalia, Naperville, Ill.
[73] Assignee: GTE Automatic Electric Laboratories Incorporated, Northlake, Ill.

[22] Filed: Dec. 4, 1972
[21] Appl. No.: 312,017

[52] U.S. Cl. .................... 179/18 GF
[51] Int. Cl. .................... H04q 3/42
[58] Field of Search......... 179/18 E, 18 EA, 18 AG, 179/18 FC, 186 E, 186 F, 22, 91, 98

[56] References Cited
UNITED STATES PATENTS
3,193,731 7/1965 Gerlach et al. .................... 179/91
3,546,390 12/1970 Hackenberg et al. .................... 179/18

*Primary Examiner*—Kathleen H. Claffy
*Assistant Examiner*—C. T. Bartz

[57] ABSTRACT

A switching network unit for use in comprising an overall communication switching network includes concentrator, distributor and mixer group modules structured from square crosspoint matrix arrays having an equal number of inlet and outlet terminals thereto. The fabric of the network unit provides an identical arrangement of crosspoint arrays within each of the concentrator, distributor and mixer group modules, a higher efficiency of network capacity in terms of traffic per crosspoint over known switching network units having the same number of crosspoints, and increased number of unique communication paths from inlet to junctor terminals and a full N:1 concentration ratio availability of inlet terminals to internal links. The present network configuration manifests itself in a most convenient and simple packaging arrangement through the use of a singular printed circuit board mounting and singular network frame accommodation.

7 Claims, 1 Drawing Figure

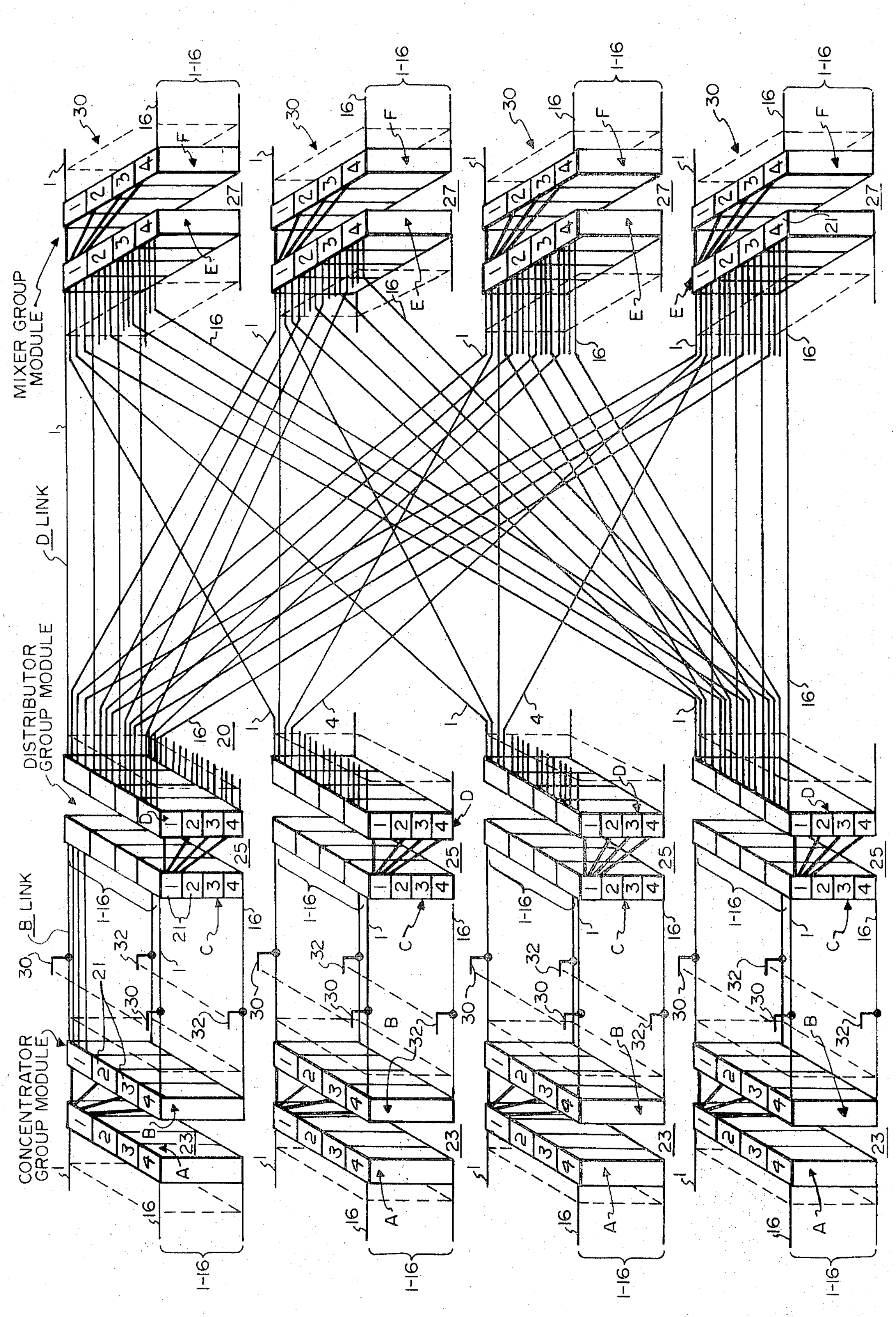
MIXER GROUP MODULE
D LINK
DISTRIBUTOR GROUP MODULE
B LINK
CONCENTRATOR GROUP MODULE

CROSSPOINT MATRIX ARRANGEMENT FOR SPACE-DIVISION COMMUNICATION SWITCHING NETWORK

BACKGROUND

This invention relates generally to space-divided telephone communication switching networks, and more particularly, relates to a crosspoint matrix arrangement having greatly improved accessibility from the input terminals to the output terminals thereof, and a reduced number of component matrices.

In prior art crosspoint matrix arrangements for spacedivided communication switching networks, there is thought to be provided at best two "unique" communication paths from any given input or inlet terminal (incoming link) to a desired output or outlet terminal (terminating junctor). The term "unique" is applied in reference to the condition of a first communication path wherein no other communication paths from other incoming links are joined to the first communication path. Thus, it is obvious that the probability of incurring a blocked condition within a given crosspoint matrix and thus failing to establish a completed connection between an input link and a desired output junctor is substantially lowered through increasing the number of available unique paths from any junctor to any inlet. The crosspoint matrix arrangement of the present invention provides four such unique communication paths from any given inlet to any given terminating junctor. It is generally understood that crosspoint switching matrix arrangements are comprised of a plurality of fixed size crosspoint arrays such as four by four, five by five, four by eight and ten by eight arrays which are used as building blocks to construct a larger switching network commonly known as a switching network unit. These network units are then combined as needed to comprise the overall size switching network which is required to handle a known traffic load capacity. In a conventional manner well understood in the telephone art, the switching network units are usually comprised of concentrating, distributing and expanding stages. At present, switching metwork configurations or matrix arrangement commonly known as the fabric of the switching network employ at least two different size crosspoint arrays in fabricating existing switching network units. Many times in order to achieve the desired network capacity when measured in terms of traffic load per crosspoint, some existing overall switching networks also combine switching network units having two or more different network fabrics. It is readily apparent that such non-uniformity leads to increased economic costs, unduly large network fabrications and the usage of extra equipment frames than would be the case if all switching network units were of the same fabric and all the basic switching arrays within the network units were identical, i.e., have the same number of crosspoint connections. Another disadvantage of existing switching network units is that there is no known switching network unit that can provide with such modular uniformity a full N:1 concentration ratio of network inlet terminals to its internal links. It is proposed herein to provide a switching network unit having a very simple fabric consisting solely of four by four crosspoint arrays and arranged in a six stage "square array" network which affords a full N:1 concentration ratio of network inlet terminals to its internal links.

SUMMARY

It is therefore an object of the present invention to provide a novel switching network unit which has a greatly simplified, more economical and uniform network fabric.

It is an object of the invention to provide a basic network fabric comprised entirely of squared switching arrays each having an equal number of inlet and outlet terminals.

It is another object of the invention to provide a network unit fabric which is capable of providing a full N:1 concentration ratio of inlet terminals to its internal links.

It is still another object to provide in addition to the standard concentrating and distributing stage of known switching network units, a novel mixing stage which provides an increased number of unique paths from any terminating junctor to any inlet.

A crosspoint matrix arrangement for a space-divided communication switching network includes first, second and third order switching means having a plurality of square crosspoint arrays therein. Each of the square crosspoint arrays has the same number of input and output terminal connections thereto. The square crosspoint arrays are aranged in first and second spacedivided switching stages for the first order switching means, third and fourth space-divided switching stages for the second order switching means and fifth and sixth space-divided switching stages for the third order switching means. A predetermined number of the square crosspoint arrays corresponding to the number of output terminal connections for each of the square arrays are aligned in a coplanar arrangement with each other within the first, third and fifth stages and are aligned in the coplanar arrangement with a like number of the square arrays within the second, fourth and sixth stages, respectively. Each of the square arrays of the first, third and fifth stages include an output terminal connection thereof in communication with an input terminal connection of each of the second, fourth and sixth stage arrays, respectively. There are a plurality of such coplanar arrangements provided in each of the first, second and third order switching means with the coplanar arrangements being oriented in stacked parallel relation with respect to each other and being equal to the cumulative number of input terminal connections for the square arrays of each coplanar arrangement of the first, third and fifth stages. Each of the stacked coplanar arrangements for the first and second order switching means communicate with a coplanar arrangement of a like planar order within the second and third order switching means, respectively.

THE DRAWING

The single FIGURE of the drawing hereafter referred to as FIG. 1 is partially a block diagram and partially a schematic representation of the crosspoint matrix arrangement and internal link interconnection pattern of the present invention and shows concentrator, distributor and switching stages thereof.

DETAILED DESCRIPTION

There is shown in FIG. 1 a six stage crosspoint matrix arrangement hereinafter termed a network unit 20 which is particularly useful for constructing an overall space-divided communication switching network which may have a wide variety of number of terminals per network. The switching network unit 20 is illustrative of a manner of connecting a set of incoming or inlet terminals to their respective outgoing or outlet terminals (junctors). It is to be noted that other swtiching network units of a similar or dissimilar internal linking pattern could be combined with the network unit 20 as shown to comprise a larger switching matrix, if desired. The network unit 20 is comprised solely of a crosspoint switching matrix array 21 having a square or squared configuration of an equal number of inlet terminals and outlet terminals, namely, four inlet and four outlet terminals presenting some sixteen interim crosspoints and commonly called a four by four array.

According to the principles of the present invention, the 4×4 arrays 21 are used to comprise concentrator group modules 23, distributor or grid group modules 25 and mixer group modules 27, all of which are essentially identical in their internal arrangement of the square arrays 21. As is shown in FIG. 1, a typical concentrator group module 23 is comprised of a first or "A" stage and a second or "B" stage of square arrays 21 with there being four of these square arrays 21 within each of the "A" and the "B" stages, which stages are pictorially illustrated as being aligned in substantially parallel rows within a common plane (see the arrays numbered 1–4 in FIG. 1). Sixteen such coplanar arrangements containing four A-stage and four B-stage arrays are then provided in stacked parallel relation to each other. Hence, it is apparent that a given coplanar arrangement of such "A" and "B" stages then presents some 16 input terminals extending to each of the 16 coplanar arrangements and an equal number of output terminals extending therefrom for providing a total of 256 such inlet and outlet terminals. There are provided between the "A" and "B" stages of the concentrator group modules 23, internal "A" communication links which are used to connect the "A" stage outlets to the "B" stage inlets. The internal distribution of the "A" communication links are distributed in accordance with the pattern shown in FIG. 1 for a single square array, namely, one of the outlet terminals of each "A" stage array is connected to an inlet terminal of each "B" stage array. It is also to be noted that the number of the square arrays 21 in each plane in a particular stage, namely, four, is equal to the number of input or output terminal connections of an individual square array 21.

A typical distributor group module 25 is comrpised of a third or "C" stage and a fourth or "D" stage of the square arrays 21 which stages are likewise oriented in a plurality (16) of stacked coplanar arrangements. Each of the coplanar arrangements thereof include four "C" stage arrays and four "D" stage arrays as clearly shown in FIG. 1. Internal "C" communication links are used to interconnect the "C" and "D" stage crosspoint arrays in an identical manner as previously set forth in connection with the concentrator group module 23. However, in accordance with the call processing pattern of this invention, the multiplicity of stacked planes of the coplanar arrangements of both the concentrator and distributor group modules 23 and 25 are oriented so as to be generally perpendicular to each other as is illustrated by the horizontal and vertical orientations shown in FIG. 1. The purpose of this orientation is to illustrate the facilitation of a provision for separate communication link paths extending from the four outlet terminals of any given "B" stage array to an inlet terminal of a " C" stage array within a different one of the stacked coplanar arrangements of the distributor group module 25. Thus, the connection pattern for internal "B" communication links as used to interconnect between "B" and "C" stage arrays presents all 16 outlet terminals of the "B" stage arrays for a selected one of the coplanar arrangements within the concentrator module 23 to be connected to inlet terminals of the "C" stage arrays for all 16 coplanar arrangements within the distributor module 25. There are provided internal "D" communication links to interconnect the "D" stage outlet terminals to fifth or "E" and sixth or "F" stage arrays within the mixer group modules 27.

The pairs of connection points 30–30 and 32–32 on the internal "B" links between the four concentrator and distributor group modules 23 and 25 are used to illustrate the points of connection for other concentrator group modules (not shown) which may be connected in parallel with each of the four concentrator group modules 23 of FIG. 1. With one additional concentrator group module 23 being used with a given concentrator group module 23 shown in FIG. 1, a concentration ratio of 2:1 is obtained between inlet terminals for that particular concentrator module 23 to internal "B" communication links therefor. When still an additional concentrator group module is used in parallel with the above-described pair of concentrator group modules, a concentration ratio of 3:1 is achieved. N number of concentrator group modules can similarly be added to achieve concentration ratios of N:1. No other crosspoint matrix arrangement is known to achieve with such modular uniformity a full N:1 concentration ratio of its network inlet terminals to its internal communication links.

Each of the concentrator group modules 23 with its associated distributor group module 25 comprises a network branch with there being four such branches shown in FIG. 1. The internal "D" communication links interconnect the plurality of "D" stage arrays in any selected one of the coplanar arrangements of the distributor modules 25 with four separate mixer group modules 27. Each additional network branch provides a capacity of 256 inlet terminals to the network unit 20. The present arrangement of the square arrays 21 then provides the ready addition of up to four such branches to expand the network inlet capacity to some 1,024 inlet terminals. With an N:1 concentration ratio being provided, there would be N×1,024 inlet terminals for the network unit 20 or N×256 inlet terminals for any particular network branch of the network unit 20.

A typical mixer module 27 is comprised of a corresponding plurality (16) of stacked coplanar arrangements of the square arrays 21, which square arrays are arranged in the aforementioned "E" and "F" stages each having four such arrays in each of the 16 horizontal planes. Additionally, there are provided internal "E" communication links used to interconnect the "E" and "F" stages in the same pattern as utilized for the "A" and "C" internal communication links. The outlet terminals for the "F" stage arrays comprise junctor terminals 29 for the swtiching network unit 20. The junctor terminals 29 can then be used in conventional manner as an interconnecting or intraoffice trunk terminating on a crossbar switch in a switch frame, and the network unit 20 can obviously be employed as either a folded or non-folded network with full N:1 concentration ratios available.

As previously stated, the stacked coplanar arrangements of these square arrays 21 within the concentrator and distributor group modules 23 and 25 are conveniently oriented in horizontal and vertical planes, respectively. The 16 horizontal coplanar arrangements within each of the concentrator group modules 23 are interconnected through the "B" communication links to a correspondingly numbered horizontal plane of inlet terminals of "C" stage arrays. It is to be noted that all such "C" stage arrays which are interconnected to a given horizontal plane of "B" stage arrays are included within separate ones of the 16 vertical coplanar arrangements within each of the distributor group modules 25. A given horizontal plane of outlet terminals from each of the distributor group modules 25 is routed by the "D" communication links to four separate horizontal planes of inlet terminals of the mixer group modules 27. It is this particular call distributing pattern characterized by the provision of four separate paths from a given inlet terminal to any particular junctor terminal 29 that provides the improvement against call blocking and the increased efficiency of traffic as measured by traffic per crosspoint. The resulting network capacity of the network unit 20 is thought to provide approximately 10 to 20 percent higher efficiency as compared to other known switching network units with the same number of crosspoint connections.

Now considering the detailed interconnection pattern employed by the "D" communication links, the distributor and mixer group modules 25 and 27 may be considered as first through fourth units, respectively, when viewed from top to bottom in FIG. 1. A portion of the "D" linked interconnection pattern will be described which exists between the uppermost horizontal planes of the distributor and mixer group modules 25 and 27 with the remaining portion of the "D" linked interconnection pattern being merely a repetitive pattern readily understood from the portion of the overall pattern described herein. Accordingly, the pertinent outlet and inlet terminals have been numbered 1–16 for illustrating their unique interconnection pattern. For the uppermost horizontal plane of the first distributor module 25 which plane is comprised of the outlet terminals from each of 16 vertical coplanar arrangements, the outlet terminals 1–16 are interconnected to the uppermost horizontal plane of the mixer module 27 in the following manner: outlet 1 of the distributor module 25 to inlet 1 of the first mixer module 27 (it being understood without further reference that the uppermost horizontal plane is being referred to); outlets 2–4 to inlets 1 of the second through fourth mixer modules 27, respectively; outlets 5–8 to inlets 5 of the first through fourth mixer modules 27, respectively; outlets 9–12 to inlets 9 of the first through fourth mixer modules 27, respectively; and outlets 13–16 to inlets 13 of the first through fourth mixer modules 27, respectively.

Now, the interconnection pattern for the uppermost horizontal plane of the second distributor module 25 is set forth herein as briefly as possible, to wit: outlets 1–4 thereof to inlets 2 of the first through fourth mixer modules 27, respectively; the remainder of the pattern is not shown in the drawing, but it is readily apparent that outlets 5–8 connect to inlets 6 of the first through fourth mixer modules 27, respectively; outlets 9–12 connect to inlets 10 of the first through fourth mixer module 27, respectively; and outlets 13–16 thereof connect to inlets 14 of the first through fourth mixer modules 27, respectively. The interconnection pattern for the uppermost horizontal plane of the third distributor module 25 is as follows: outlets 1–4 thereof connect to the inlets of the first through fourth mixer modules 27, respectively; and although not shown in the drawing, outlets 5-8 thereof connect to inlets 7 of the first through fourth mixer modules 27, respectively; outlets 9–12 thereof connect inlets 11 of the first through fourth mixer modules 27, respectively; and outlets 13–16 thereof connect to inlets 15 of the first through fourth mixer modules 27, respectively. Finally, the interconnection pattern for the uppermost horizontal plane of the fourth distributor module 25 accords the connections of the outlets 1–4 thereof to inlets 4 of the first through fourth mixer modules 27, respectively; the outlets 5–8 thereof connect to inlets 8 of the first through fourth mixer module 27, respectively; outlets 9–12 thereof connect to inlets 12 of the first through fourth mixer modules 27, respectively; and outlets 13–16 thereof connect to inlets 16 of the first through fourth mixer modules 27, respectively.

It is to be understood that while an N×1,024 inlet terminal switching network unit has been described herein, the switching network unit 20 is capable of a variety of inlet terminal configurations. Each of the four branches of the network unit are used to add an additional 256 inlets to the total line capacity of the switching network. If a smaller network is desired, for example, 256 or 512 inlet networks, one or two branches of the network, respectively, could be employed with the four mixer group modules 27. If a larger basic network than 1,024 terminals at a 1:1 concentration ratio is desired, an additional switching network unit 20 must then be utilized with interconnection between switching network units 20 being made at the junctor terminal 29.

The present switching network permits a particularly advantageous packaging arrangement through utilizing existing state-of-the-art size printed wiring cards and equipment frames. Each planar arrangement of eight 4×4 matrix arrays 21 is conveniently packaged on a single printed wiring card. Hence, there are 16 such printed wiring cards to comprise each concentrator, distributor and mixer group module. Up to four group modules can be mounted on a given equipment frame, i.e., up to 64 printed wiring cards with the present frame configurations. Now, the convenience of such an arrangement is readily apparent wherein any given printed wiring card can be utilized in any selected one of the concentrator, distributor and mixer group modules, and any equipment frame can then be utilized as either a concentrator, distributor, or mixer group module interchangeably. Therefore, it is to be noted that while the present invention has been shown and described with reference to the preferred embodiment thereof, the invention is not intended to be so limited, and various modifications and changes may be apparent to those skilled in the art without departing from the spirit and scope of the invention.

I claim:

1. A crosspoint matrix arrangement for a space-divided communication switching network including a plurality of square arrays of crosspoint connections having input terminals and output terminals equal in number to the number of input terminals respectively, said matrix arrangement comprising first, second, and third order switching means including a corresponding plurality of said square arrays, respectively, said square arrays being associated in first and second space-divided switching stages for said first order switching means, third and fourth space-divided switching stages for said second order switching means and fifth and sixth space-divided switching stages for said third order switching means, a predetermined number of said square arrays corresponding to the number of input terminal connections for each of said square arrays providing a space-related grouping of said square arrays within each of said first, third and fifth stages and a corresponding identical space-related grouping of said square arrays within each of said second, fourth and sixth stages, respectively, each of said square arrays within a selected spacerelated grouping of said first, third and fifth stages having an output terminal thereof connected to an input terminal of each of said square arrays within an associated one of said identical space-related groupings of said second, fourth and sixth stage arrays, respectively, a plurality of said space-related groupings and said identical space-related groupings provided in each of said first, second and third order switching means, said plurality thereof being equal in number to the number of input terminal connections to said square arrays of each space-related grouping of said first, third and fifth stages, respectively, each of the output terminals of a selected one of said identical space-related groupings of said second switching stage being connected to an associated input terminal of a different one of said space-related groupings of said third switching stage and each of the input terminals of a selected one of said space-related groupings of said fifth switching stage being connected to an associated output terminal of a different one of said identical space-related groupings of said fourth switching stage, respectively, for interconnecting said first, second and third order switching means.

2. The crosspoint matrix arrangement of claim 1 wherein the plurality of said space-related groupings and said identical space-related groupings of said first order switching means comprises a first unit of such space-related groupings within said first order switching means having N-number of such units including said first unit thereof, each of the output terminals of a selected one of said identical space-related groupings of square arrays within said second stage of each unit of N-number of units is connected to an associated input terminal of a different one of said space-related groupings of said third switching stage having a number of space-related groupings corresponding in number to the number of said groupings of square arrays of said first unit whereby there is provided N number of units of space-related groupings of square arrays in said first order switching means and a single unit thereof in said second order switching means.

3. The crosspoint matrix arrangement of claim 2 wherein the first order, second order and third order switching means comprise concentrating, distributing and mixing switching means, respectively.

4. The crosspoint matrix arrangement of claim 1 wherein said first ans second stages of said first order switching means comprise a concentrator group module, said third and fourth stages of said second order switching means comprise a distributor group module and said fifth and sixth stages of said third order switching means comprise a plurality of mixer group modules, said plurality of mixer group modules being equal in number to the number of input terminal connections for each of said square arrays, and each of the input terminals of a selected one of the space-related groupings of the fifth switching stage within each of the mixer group modules is connected to an associated output terminal of a different one of said identical space-related groupings of the fourth switching stage of said distributor group module.

5. The crosspoint matrix arrangement of claim 4 wherein said square arrays include a four by four matrix arrangement of four input terminal connections, four output terminal connections and 16 interior crosspoints.

6. A switching network unit useful for inclusion within a total communication switching network including a plurality of square arrays of crosspoint connections having input terminals and output terminals equal in number to the number of input terminals respectively, said network unit comprising at least a concentrator group module, a distributor group module, and four mixer group modules, each of said modules including a corresponding plurality of said square arrays providing first and second space-divided switching stages for said concentrator group module, third and fourth space-divided switching stages for said distributor group module, and fifth and sixth space-divided switching stages for each of said mixer group modules, a plurality of first space-related groupings of said square arrays provided within each of said switching stages, each of said first groupings being comprised of a predetermined number of said square arrays corresponding to the number of input terminal connections for each of said square arrays and each of said first groupings of square arrays within each of said first, third and fifth switching stages being selectively connected to an associated one of said first groupings of square arrays within each of said second, fourth and sixth switching stages, respectively, said plurality of first groupings of square arrays being equal in number to the number of input terminal connections within a single one of said first groupings a plurality of second space-related groupings of said square arrays provided within each of said third and fourth switching stages of said distributor group module, said second groupings in said third stage including an input terminal from each of said first groupings within said third stage and said second groupings in said fourth stage including an output terminal from each of said first groupings within said fourth stage, respectively, said plurality of second groupings of square arrays being equal in number to the number of first groupings in said distributor module, and each of said first groupings of said second stage having the output terminals thereof connected to the input terminals of an associated one of said second groupings within said third stage for interconnecting said concentrator and said distributor modules and each of said second groupings of said fourth stage having the output terminals thereof connected to the input terminals of an associated one of said first groupings within said fifth stage of each of said mixer modules for connecting said distributor module with each of said mixer modules.

7. A switching network unit as claimed in claim 6 wherein each of said square arrays within a selected first grouping thereof from each of said first, third and fifth stages has an output terminal thereof connected to an input terminal of each of said square arrays within an associated one of said first groupings of square arrays within each of said second, fourth and sixth stages, respectively.

* * * * *